United States Patent [19]

Wiebalck

[11] 4,238,791
[45] Dec. 9, 1980

[54] MODEL AIRCRAFT WITH ALTITUDE CHANGE INDICATING MEANS

[76] Inventor: Rainar Wiebalck, Lilienstr. 48/V, 8000 München 80, Fed. Rep. of Germany

[21] Appl. No.: 946,205

[22] Filed: Sep. 26, 1978

[30] Foreign Application Priority Data

Sep. 27, 1977 [DE] Fed. Rep. of Germany ....... 2743385
May 30, 1978 [DE] Fed. Rep. of Germany ....... 2823608

[51] Int. Cl.³ .................... H04B 7/00; G01C 21/00
[52] U.S. Cl. ................... 340/694; 340/25; 340/27 AT; 364/433; 272/31 A; 244/180; 73/179; 73/384
[58] Field of Search .......................... 343/225, 228; 340/27 AT, 27 R, 25, 694, 696; 73/179, 384, 386, 723; 364/433; 318/584; 244/180, 181, 182, 194; 272/31 A, 31 B; 273/101; 46/226, 227, 228, 232, 45

[56] References Cited

U.S. PATENT DOCUMENTS

| 2,819,615 | 11/1958 | Colt ..................................... 73/179 |
| 3,572,115 | 3/1971 | Feuer .................................. 73/179 |
| 3,713,340 | 1/1973 | Springer ............................. 73/384 |
| 3,769,827 | 11/1973 | Moore ................................ 73/179 |
| 4,006,472 | 2/1977 | Greene ........................... 340/27 R |
| 4,049,223 | 9/1977 | Watson ............................... 244/180 |
| 4,160,339 | 7/1979 | Dankman et al. ............. 340/27 AT |

OTHER PUBLICATIONS

Modell (Germany), "An Altitude Measuring and Indicating Device for Model Aircraft", Nov. 1972, pp. 426–428.

*Primary Examiner*—John W. Caldwell, Sr.
*Assistant Examiner*—Donnie L. Crosland
*Attorney, Agent, or Firm*—Becker & Becker, Inc.

[57] ABSTRACT

A model aircraft with wireless earth-to-craft control. A device is aboard to emit signals indicating altitude change and visible by the operator on earth, this device being triggered operatively by signals produced by an air-pressure transducer of small size and having low inertia of movable parts.

15 Claims, 2 Drawing Figures

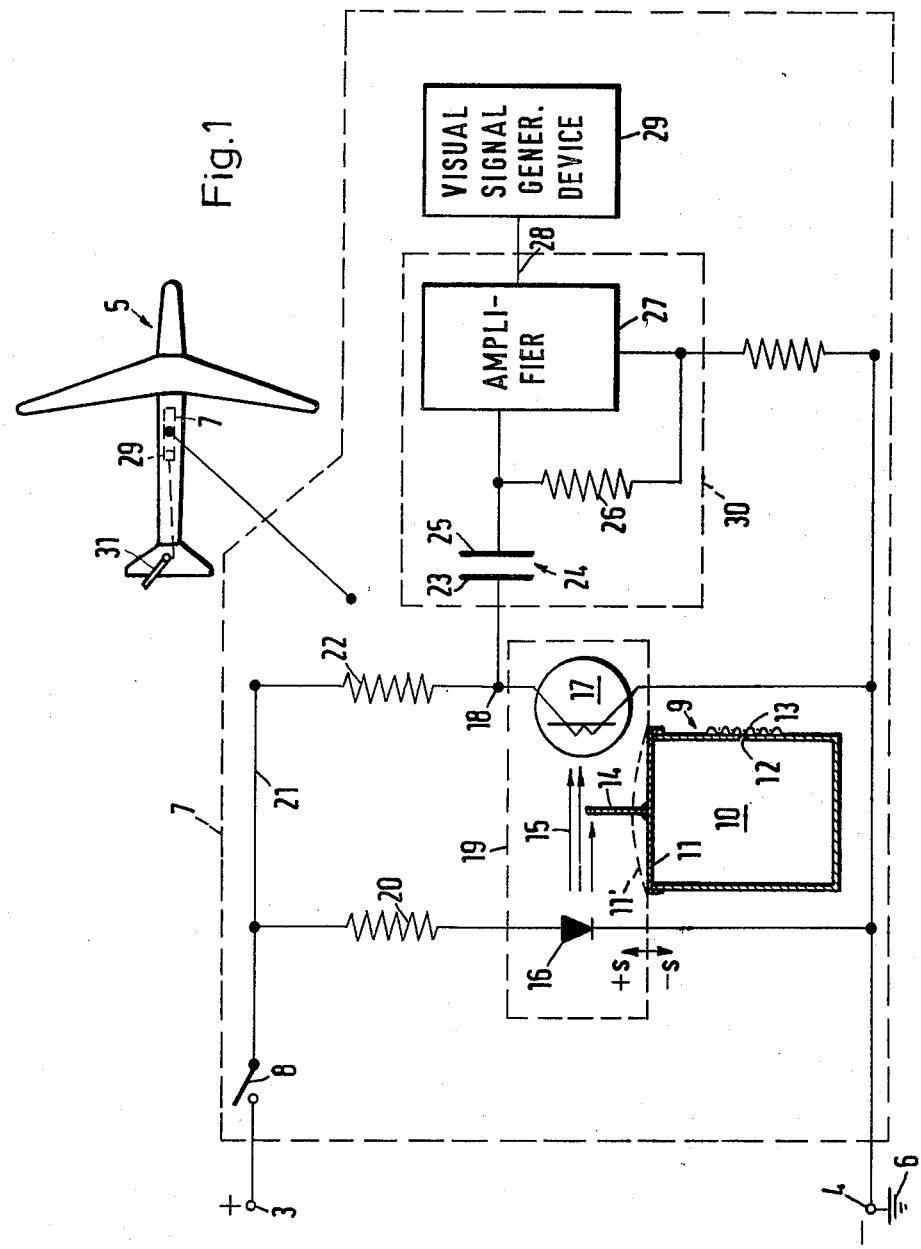

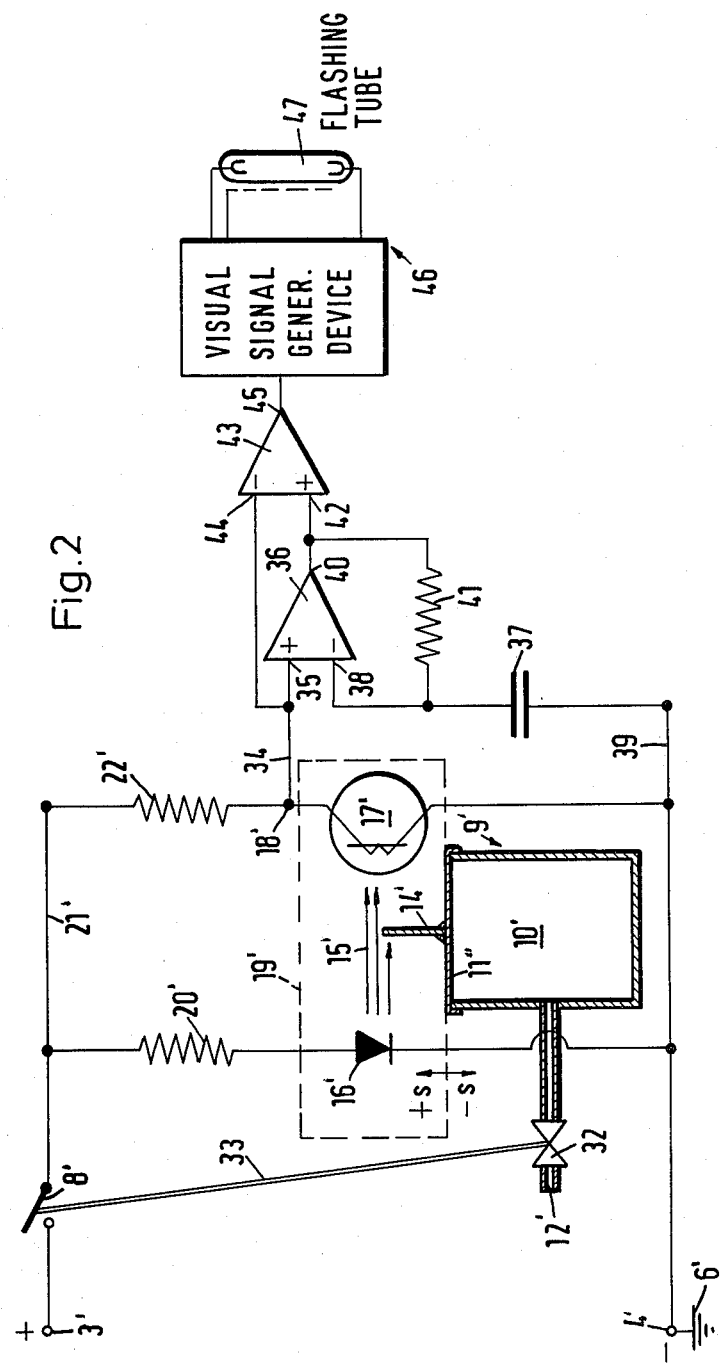

MODEL AIRCRAFT WITH ALTITUDE CHANGE INDICATING MEANS

BACKGROUND OF THE INVENTION

1. Field of the Invention

The present invention relates to a model aircraft, such as a non-powered model glider, with wireless earth-to-craft control and having aboard an altitude change indicating device for signalling the existence of such change to the operator. Hereinafter a model aircraft of this type will be referred to as a model aircraft of the type set forth.

2. Description of the Prior Art

In the German journal "Modell", Neckar-Verlag, Villingen 1972, pages 426 to 428 and 479 to 484, a model aircraft of the type set forth is described utilizing an evacuated spring-biased capsule of the kind usually found in a weather-glass for sensing ambient air pressure. Preparatory to use in flight, the instrument requires adjustment to the prevailing barometric pressure at a starting point, which is done by setting a spring of the spring-biased capsule. A core of magnetizable metal is mounted on a deflectable wall of the capsule and is displaced relative to an induction coil in accordance with altitude change, thereby changing inductivity of the coil. Since the coil is part of an electric oscillating circuit, frequency of oscillation is changed due to wall movement. This change of frequency is signallized to a wireless transmitter, then transmitted to the earth and transformed into audible signals in a receiver carried by the operator. The signals are repetitive sounds similar to those of a Geiger counter. An increasing frequency of the sounds indicates climbing of the aircraft and a decreasing frequency indicates descent thereof.

A disadvantage of these altitude change indicating means is the great expense of a wireless transmitter and receiver. Another disadvantage is that many countries require an official permission for model aircraft-to-earth radio transmission but not vice versa for earth-to-aircraft radio transmission.

SUMMARY OF THE INVENTION

Main Feature

The present invention seeks to overcome the aforementioned problem. A model aircraft of the type set forth is provided with a pressure-sensitive means for sensing atmospheric pressure change as flight altitude is changing and producing output signals representing atmospheric pressure change. Furthermore, a device is provided on board with the aircraft for generating and emitting visual signals visible by an operator on the earth. Means are also provided for supplying the output signals to the device for generating and emitting visual signals to trigger the device to be operative in accordance with occurrence of the output signals.

Objects

It is a primary object of the invention to provide an improved model aircraft of the type set forth not requiring craft-to-earth radio transmission.

It is also an important object of the invention to provide an improved model aircraft of the type set forth presenting to the operator a novel enjoyment and experience with his hobby.

Hereinafter the words "as described" means "as described in paragraph 1 of SUMMARY".

It is another object of the invention to provide a model aircraft as described whereby signals of good visibility are emitted.

It is a further object of the invention to provide a model aircraft as described wherein generation of visual signals does not require much battery energy so that a battery of low weight may be installed.

It is a fifth object of the invention to provide a model aircraft as described whereby visual signals other than electric light signals are emitted to save still more battery energy.

It is a sixth object of the invention to provide a model aircraft as described wherein an air-pressure sensitive capsule is used, simple in form, low in weight, economical to produce, reliable in operation, and not requiring complicated adjustment before a flight.

It is a seventh object of the invention to provide a model aircraft as described wherein an air-pressure sensitive capsule of the differential pressure chamber type is used, generating accurate signals, although being extremely small.

It is an eighth object of the invention to provide a model aircraft as described wherein an air-pressure transducer with electrical output is used, having low inertia of movable parts and being insensitive relative to centrifugal forces, landing shocks, and certain maladjustment.

Other objects, features, and advantages of the invention will become more apparent with reference to the succeeding detailed description thereof, and to the drawings illustrating two preferred embodiments thereof.

BRIEF DESCRIPTION OF THE DRAWINGS

In the Drawings:

FIG. 1 is a schematic diagram of a first exemplary embodiment of an altitude change indicating device for a model aircraft according to the invention, using a non-evacuated pressure-sensitive capsule having a vent permanently open. Means are provided to cause a clearly visible flight direction change dependent upon altitude change.

FIG. 2 is a schematic diagram of a second exemplary embodiment of an altitude change indicating device for a model aircraft according to the invention, using a non-evacuated pressure-sensitive capsule having a vent not permanently open. Light signals are emitted dependent upon altitude change.

DETAILED DESCRIPTION OF THE PREFERRED EMBODIMENTS

Referring to the embodiment of FIG. 1, there are provided positive and negative terminals 3, 4 which are connected to the battery, such as a 4-volt battery, of a (powered or non-powered) model aircraft 5. Terminal 4 is connected to a point of reference or ground potential, represented by the numeral 6.

An altitude change indicating device 7 on board the craft 5 is shown within outline of outer dashes. For turning on or off an electrical system of the device 7, a switch 8 is provided for manual or remote control.

Numeral 9 designates a pressure-sensitive capsule. Although, if desired, an evacuated capsule of small size may be installed, it is preferred that a non-evacuated capsule 9 is utilized. This capsule 9 is extremely simple in construction, small in size and weight, and economical to produce, thus being specially suitable for the use within a model aircraft. Capsule 9 has a cup-shaped casing forming a chamber 10, the open end of the cup being closed air-tight and in drum skin manner by a tautly stretched membrane 11. This membrane 11 functions simultaneously as a deflectable wall and return spring means. Furthermore, membrane 11 has negligible inertia and is not subject to vibrations, thus being specially suitable for the use in question.

Chamber 10 is a differential pressure chamber and membrane 11 is subjected on one side to ambient air pressure and on the other side thereof to pressure in differential pressure chamber 10; this latter pressure is essentially equal to ambient air pressure $\pm$ a pressure differential $\Delta P$ caused by altitude change. According to the first exemplary embodiment of this invention, an opening 12 is provided permanently to vent the chamber 10 to atmosphere. Various instruments for indicating altitude or altitude change are known in aeronautics art having a differential pressure reservoir and a restricted opening to vent the reservoir to ambient atmosphere (e.g. U.S. Pat. No. 2,309,400 Kollsman issued Jan. 26, 1943). All these prior instruments, however, have utilized differential pressure chambers of relatively great capacity, not designed for accommodation in a model aircraft.

The pressure-sensitive capsule 9, in contrast thereto, is remarkably small in capacity (e.g. 20 cm$^3$ or less). Consequently, the problem arises that an air-venting opening of conventional size in the small chamber 10 causes a rapid pressure equalization detrimental to providing accurate signals. Accordingly, an element 13 (e.g. of fabric) nearly air-impermeable necessarily must be installed within the path of the venting air so that pressure equalization requires a relatively long time. Once that pressure equalization is effected, membrane 11 returns to its zero location, i.e. plane position.

When ambient air shows reduction in air pressure as the aircraft is climbing, membrane 11 is deflected outwardly as shown in exaggerated way by a line 11'. When the aircraft is descending, movement of membrane 11 is inwardly (vice versa). In FIG. 1, directions of the membrane movement outward or inward (deflection $\pm s$) are indicated by arrows.

Deflection of membrane 11 from its zero position is minimal and sensing absolute value of deflections ($+s$ or $-s$) would require high precision. It is much easier to sense deflection rate only, i.e. using first derivative of deflection with respect to time ($\pm ds/dt$), since this value is a representation of the amount of altitude change.

The preferred embodiments of the invention make provision to transform the values $\pm ds/dt$ into electrical signals. Present day mechanical electrical transducers have the well-known advantage to transform motion into electrical signals by contactless means so that friction is eliminated. Although a transducer of any suitable type may be used to transform motion of membrane 11 into electrical signals, preferably the transducer is of the kind in which an element, more or less restricting a light-path, is displaced with respect to the light-path, thereby decreasing or increasing intensity of light impinging upon a photoelectric device. Such a light-path restricting element or light-shield, designated by numeral 14, is mounted on the face of membrane 11 to follow deflections thereof and to be moved transversely to light rays 15 emanating from an electroluminescent diode 16 and received by a phototransistor 17. Instead of light, non-visible radiation may be used in a similar way as will be apparent to those skilled in the art.

The assembly of elements 9, 14, 16, 17 is an air-pressure transducer having an electrical transducer output 18. Sub-assembly of elements 11, 14, 16, 17 is an air-pressure actuated mechanical-electrical transducer 19. Pressure electrical transducers are known in the art utilizing a light-path restricting means moving transversely to light rays emanating from a light source and received by photoelectric means (e.g. U.S. Pat. No. 3,314,407). However, the utilization of such a transducer within the field of present invention has advantages peculiar to this field. For example, a light-shield 14 may be manufactured practically inertia-less, so that it will not be subjected to centrifugal forces during banking turns of the aircraft, which might cause inaccurate signals. A weighty metal core as a movable element of a transducer, as described with reference to prior art, does not have this advantage. Furthermore, since inertia of the light-shield 14 is negligibly small, the shield 14 is insensitive to vibrations and severe landing shocks which would cause maladjustment or damage with respect to transducer (e.g. when a just mentioned metal core is utilized). In contrast hereto, even a certain maladjustment of the light source or photoelectric device with respect to the shield 14 remains without disadvantageous consequences, since, as pointed out previously, it is not the membrane deflection $\pm s$ that is detected by the photoelectric means, but rather there is detected the deflection differentiated with respect to time $\pm ds/dt$.

A current limiting resistor 20 is arranged between a supply line 21 and an electroluminescent diode 16. Another resistor 22 is arranged between the line 21 and a phototransistor 17. In this example, assumption is made the ohmic values of resistor 22 and of phototransistor 17 are equal.

Since both elements including resistor 22 and phototransistor 17 act as a voltage divider, voltage across the line 21 and the transducer output 18 is half of voltage across the line 21 and point of reference or ground potential 6. Transducer output 18 is connected to a positive electrode 23 of a capacitor 24. Biasing voltage at a negative electrode 25 of the capacitor 24 is assumed to be 0.7 volt, determined by ohmic value of a feed-back resistor 26. A voltage differential at the positive electrode 23 of the capacitor 24 occurs when intensity of light rays between electroluminescent diode 16 and phototransistor 17 is changed. With such light-ray intensity change, the ohmic value of phototransistor 17 is changed so that voltage at a voltage-dividing point (the transducer output) 18 is raised or lowered accordingly. A voltage differential (voltage differentiated with respect to time) is a non-DC signal capable to pass a DC barrier (capacitor) 24 and creates a corresponding voltage differential at electrode 25, for example an increase of biasing voltage from 0.7 volt to 0.7001 volt. An amplifier 27 is provided to generate greatly amplified representations of voltage differential occurring at the electrode 25 so that the voltage differential signal of 0.0001 volt is amplified in amplifier 27 e.g. 10,000 times. Thus voltage at the amplifier output 28 gains 1 volt, which amplified signal in turn triggers a device 29 for generating visual signals operatively. These visual signals are emitted from the air craft down to earth to tell the operator that craft is climbing. Although, if desired, signals for indicating climbing and other signals for indicating descending may be emitted, it is preferred that only climbing be signallized. This helps to save battery energy and a battery of lower weight may be installed.

A differentiating circuit 30 including a capacitor 24, an amplifier 27 and a feed-back resistor 26, as just described, is known with respect to aircraft altitude change metering devices; such a circuit is also shown in a similar arrangement in U.S. Pat. No. 3,572,115. This patent shows an altitude rate transducer and computing circuit for giving to the pilot accurate information on aircraft climbing/descending rate $\pm dH/dt$. In contrast hereto a model aircraft flight amateur wishes to have a device telling him the existence (rarely the precise rate) of model aircraft altitude change.

Referring again to FIG. 1, a particular kind of visual signals, hereinafter referred to as "buzzard type signals", now being disclosed with the origin of this name or designation becoming readily apparent.

To generate signals of this type, a device 29 is connected to a side rudder 31 of a model aircraft 5 thereby when operative displacing the rudder 31 in extreme outward position as shown in the drawing. Consequently, the model aircraft starts flying in a circle like a bird of prey, e.g. a buzzard, thus signalling to the operator that the model aircraft is climbing.

A first advantage of buzzard-type signals is that such signals are clearly visible from the earth even at a time of brightest sunshine, since the whole aircraft is the indicator element itself.

Another advantage is that there is good chance for a model aircraft, when circling, to remain within the limits of an upwind field.

A further advantage is that only a little battery energy is required for the generation of the buzzard-type signals.

A further advantage is that a device generating the buzzard-type signals is specially suited for small-size model aircraft, being used in great number. A small-size model aircraft is not capable or designated for carrying a larger battery necessary for bright light signals.

Buzzard-type signals require a remotely controlled switch 8 to render the device 7 inoperative when model aircraft circling is undesirable, e.g. during winch-operated take-off.

SECOND EMBODIMENT

FIG. 2 shows a second embodiment of the invention. Identical numerals with a prime added thereto are used to designate parts like those in FIG. 1.

With reference to FIG. 1, a constantly open vent for chamber 10 has been described having minimal air-permeability to prevent rapid pressure equalization. Conversely, good reasons exist to have an air vent of greater size, since it is easy to provide and is not subject to clogging. Both aspects appear contradictory; however, the second embodiment of the present invention teaches that the problem may be solved readily by providing a vent of clogging-proof size which is kept closed by suitable means at least during the time when altitude change is being sensed.

To put this teaching into practice, means are provided temporarily to vent the differential pressure chamber 10' before every flight, e.g. by opening a normally closed relief valve 32 thus eliminating a pressure difference across membrane 11" having eventually developed due to weather or thermal influences. During the whole flight, the valve 32 is kept closed and surprisingly membrane 11" will not come into its extreme, viz. ineffective, position despite considerable flight altitude. However, if desired for any reason, other means may be utilized to put the teaching into practice.

The valve 32 is arranged between differential pressure chamber 10' and venting opening 12'. A mechanical link 33 between a switch 8' and the valve 32 serves the purpose of closing the valve 32 when the switch 8' is closed and vice versa.

Output 18' of transducer 19' is connected via line 34 to a positive input terminal 35 of a comparator and amplifier 36. A capacitor 37 is installed between a negative input terminal 38 of comparator 36 and line 39 having ground connection. Output 40 of comparator 36 is connected via high-ohmic resistor 41 to a junction between the negative input terminal 38 and the capacitor 37. So long as voltages at input terminals 35 and 38 remain equal, this voltage also appears at the output 40. However, when a voltage differential signal appears at the line 34 (when intensity of light rays 15' is changed as described earlier), the comparator 36 compares this signal with the voltage at the negative input terminal 38 and produces an output signal which is a greatly amplified representation of voltage differential at the input terminals 35 and 38. This amplifier output signal, however, fades away when voltage at the line 34 becomes and remains stable; it fades away via high-ohmic resistor 41, thus charging the capacitor 37. Capacitor charge, in turn, increases or lifts voltage at the negative input terminal 38 so that voltages at the input terminals 35 and 38 approach each other and the amplifier output signal disappears. Finally, the line 34 and the input and output terminals 35, 38, 40 are all of equal potential. This equilibrium remains until the voltage at the line 34 changes again.

Output 40 of the comparator 36 is connected to a positive input terminal 42 of a second comparator 43, and a negative input terminal 44 of the second comparator 43 has connection to the line 34. When there is a positive amplified voltage signal at the output 40 of the first comparator 36, voltage at the positive input terminal 42 of the second comparator 43 is higher than that of the negative input terminal 44. This renders an output 45 of the second comparator 43 strongly positive and triggers visual-signal generating and emitting device 46 to be operative.

The device 46 generates repetitive flash signals emanating from a gas-discharge or flashing tube 47. Such electronic flash light signals are still visible by the operator at great flying altitude of model aircraft. As mentioned previously, it is found sufficient to emit signals only when the model aircraft is climbing.

When the model aircraft ceases climbing, voltage difference disappears at the input terminals 35, 38 of the comparator 36, and at the input terminals 42, 44 of the comparator 43 respectively. Consequently, flashing-tube 47 becomes inoperative. When the model aircraft is descending, the tube 47 will also be inoperative, since voltage at the output 45 is then negative with triggering-means of the device 46 being selected so as to be positive-voltage responsive only.

It is well known in aeronautics art to utilize air-to-ground light or flash light signals for various purposes. The idea, however, to emit air-to-ground flash light signals for indicating model aircraft altitude change has advantages not appearing in the field of manned aircraft. For example, a model aircraft is an article normally sold in a shop. When a model aircraft according to the invention is demonstrated for sale, a sales clerk takes the aircraft in hand ad goes upstairs: the model aircraft starts flashing. When the clerk stops or goes downstairs, there is no flashing. This possibility of spectacularly demonstrating the function of the invention is an important feature in sale promotion activity in a manner likewise not inherent to prior art devices.

The aspects just described do not apply to buzzard-type signals. However, this may be aided by providing a model aircraft in combination utilizing both buzzard-type and flash light signals alternatively. A remotely controlled switch may readily be provided in such combination for changing-over from signal type to the other and vice versa. Thus, advantage is taken of both signal types.

It is, of course, to be understood that the present invention is, by no means, limited to the specific showing in the drawings, but also comprises any modifications within the scope of the appended claims.

What I claim is:

1. A model aircraft with wireless earth-to-craft control and having an altitude change indicating device for signalling the existence of such change to an operator on earth, comprising:
   a pressure-sensitive means for sensing atmospheric pressure change as flight altitude is changing;
   means operatively connected to said pressure-sensitive means for producing output signals representing atmospheric pressure change;
   a device aboard the model aircraft for generating and emitting visual signals visible by the operator on earth; and
   means for supplying said output signals to the device for generating and emitting visual signals to trigger said device to be operative upon occurrence of said output signals.

2. A model aircraft according to claim 1, wherein said device for generating visual signals emits repetitive flash signals.

3. A model aircraft according to claim 1, wherein said device for generating visual signals causes side-rudder shift.

4. A model aircraft according to claim 1, wherein said device for generating visual signals is triggered to be operative only when model aircraft is climbing.

5. A model aircraft with wireless earth-to-craft control and having an altitude change indicating device for signalling the existence of such change to an operator on earth, comprising:
   a pressure-sensitive capsule having a differential pressure chamber and a movable wall to sense atmospheric pressure change as flight altitude is changing, said movable wall being subjected at its one side to ambient air pressure and at its other side to pressure in said differential pressure chamber, the latter pressure being essentially equal to ambient air pressure ± a pressure differential caused by altitude change;
   a mechanical-electrical transducer for producing at its output a voltage signal differentiated with respect to time representing position of the movable wall differentiated with respect to time;
   an amplifier for producing an output voltage signal which is an amplified representation of the output voltage signal of said transducer; and
   a device aboard the model aircraft for generating and emitting visual signals visible by the operator on earth, said device being triggered to be operative upon occurrence of said amplified voltage signal.

6. A model aircraft according to claim 5, wherein vent means are provided whereby said differential pressure chamber is vented to ambient air.

7. A model aircraft according to claim 6, wherein closure means are provided whereby said vent means is closed at least during the time when altitude change is being sensed.

8. A model aircraft according to claim 7, wherein a valve for control of said vent means is provided, said valve being closed during flight.

9. A model aircraft according to claim 5, wherein a tautly stretched membrane is provided, the open end of said capsule being closed airtight and in drum skin manner by said tautly stretched membrane.

10. A model aircraft according to claim 9, wherein capacity of differential pressure chamber is less than 20 cm$^3$.

11. A model aircraft according to claim 5, wherein a DC barrier is provided between said transducer output and said amplifier.

12. A model aircraft according to claim 5, wherein said transducer output is connected to one input terminal of a comparator and amplifier.

13. A model aircraft with wireless earth-to-craft control and having an altitude change indicating device for signalling the existence of such change to an operator on earth, comprising:
   a pressure-sensitive capsule having a movable wall for sensing atmospheric pressure change as flight altitude is changing;
   a mechanical-electrical transducer for producing at its output a voltage signal differentiated with respect to time representing position of said movable wall differentiated with respect to time;
   said transducer including a radiation source for emanating rays and a radiation-responsive electrical device for receiving said rays, the motion of said movable wall being utilized for changing intensity of rays emanated by said radiation source and received by said radiation-responsive electrical device;
   a device aboard the model aircraft for generating and emitting visual signals visible by the operator on earth; and
   means for supplying output voltage signals of said transducer to the device for generating and emitting visual signals to trigger said device to be operative upon occurrence of said output voltage signals.

14. A model aircraft according to claim 13, wherein a light shield is mounted on the movable wall of said pressure-sensitive capsule, said shield moving transversely to light rays emanated by said radiation source and received by said radiation-responsive electrical device, said radiation source including an electroluminescent diode and said electrical device including a phototransistor.

15. A model aircraft with wireless earth-to-craft control and having an altitude change indicating device for signalling the existence of such change to an operator on earth, comprising:
   (a) a pressure-sensitive capsule having a differential pressure chamber and a movable wall to sense atmospheric pressure change as flight altitude is changing,
   wherein said movable wall is subjected at its one side to ambient air pressure and at its other side to pressure in said differential pressure chamber, the latter pressure being essentially equal to ambient air pressure ± a pressure differential caused by altitude change;

wherein said movable wall is a tautly stretched membrane closing air-tight and in drum-skin manner the open end of said capsule; and wherein said differential pressure chamber is vented by a vent means to ambient air, said vent means being closed at least during the time when altitude change is being sensed;

(b) a mechanical-electrical transducer for producing at its output a voltage signal differentiated with respect to time representing deflection of said membrane differentiated with respect to time, said transducer including a radiation source for emanating rays and a radiation-responsive electrical device for receiving said rays, deflection of said membrane being utilized for changing intensity of rays emanated by said radiation source and received by said radiation-responsive electrical device;

(c) an amplifier for producing an output voltage signal which is an amplified representation of the output voltage signal of said transducer; and (d) a device aboard the model aircraft for generating and emitting visual signals visible by the operator on earth, which is triggered to be operative upon occurrence of said amplified voltage signal.

* * * * *